(12) United States Patent
Loreck et al.

(10) Patent No.: US 6,339,322 B1
(45) Date of Patent: Jan. 15, 2002

(54) SYSTEM FOR A DETECTING WHEEL ROTATION

(75) Inventors: Heinz Loreck, Idstein; Michael Zydek, Langgöns; Wolfgang Fey, Niedernhausen; Peter Lohberg, Friedrichsdorf, all of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/254,158

(22) PCT Filed: Jul. 9, 1997

(86) PCT No.: PCT/EP97/03618
  § 371 Date: May 21, 1999
  § 102(e) Date: May 21, 1999

(87) PCT Pub. No.: WO98/09173
  PCT Pub. Date: Mar. 5, 1998

(30) Foreign Application Priority Data

Aug. 28, 1996 (DE) .......................... 196 34 715

(51) Int. Cl.$^7$ ................................. G01P 3/44
(52) U.S. Cl. ..................... 324/166; 324/207.25
(58) Field of Search .................... 324/166, 173, 324/174, 207.12, 207.25, 160, 163, 165

(56) References Cited

U.S. PATENT DOCUMENTS 3,455,162 A * 7/1969 Michener et al. .......... 324/173
4,076,330 A   2/1978 Leiber
5,486,759 A   1/1996 Seiler et al.

FOREIGN PATENT DOCUMENTS

| DE | 39 32 214 | 4/1991 |
| DE | 41 14 835 | 11/1992 |
| DE | 40 21 258 | 12/1993 |
| DE | 43 08 031 | 4/1994 |
| DE | 43 13 780 | 7/1994 |
| DE | 44 34 180 | 3/1996 |
| EP | 0 727 666 | 8/1996 |

* cited by examiner

Primary Examiner—Walter Snow
(74) Attorney, Agent, or Firm—Rader, Fishman & Grauer PLLC

(57) ABSTRACT

An arrangement for determining the rotational behavior of a rotating body or encoder (3) includes a sensor module (1) which comprises a sensor element (2; 2.1 to 2.4), a controllable power source (4) supplying a load-independent current representative of the rotational behavior, a modulator (5) that controls the power source (4) as a function of signals of the sensor element (2; 2.1 to 2.4) and of signals supplied by an external signal source through an additional port (K5), and an evaluating circuit (9). The sensor module (1) is magnetically coupled to the encoder (3). The output signal of the sensor module (1) is a signal, representative of the rotational behavior, with a superimposed status signal and/or additional signal.

14 Claims, 5 Drawing Sheets

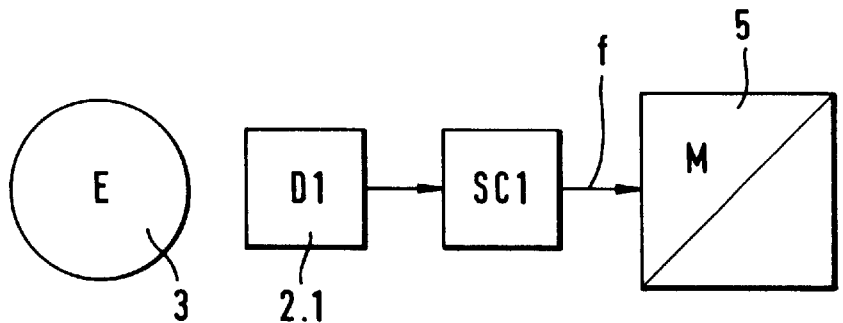
Fig. 2a
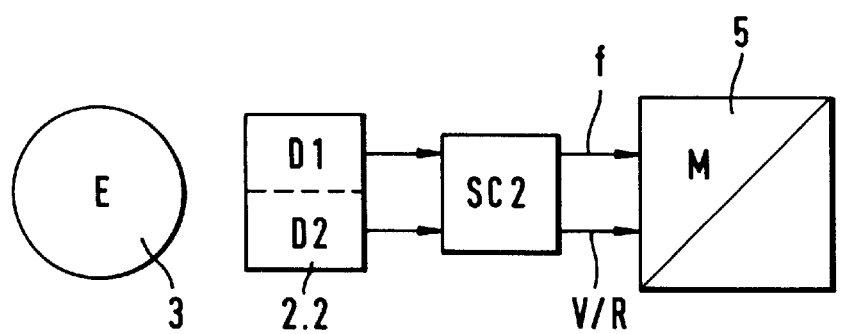
Fig. 2b
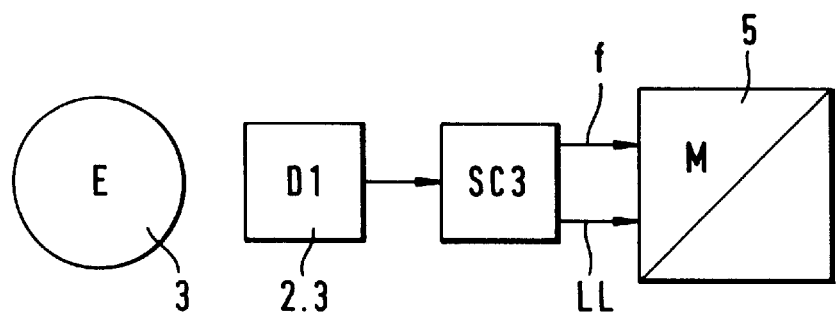
Fig. 2c
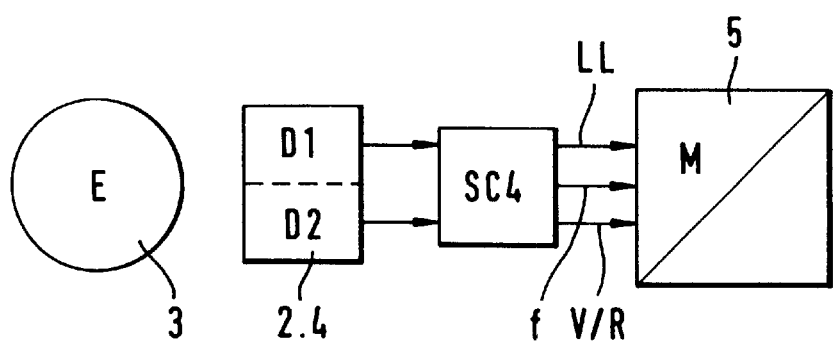
Fig. 2d
Fig. 2

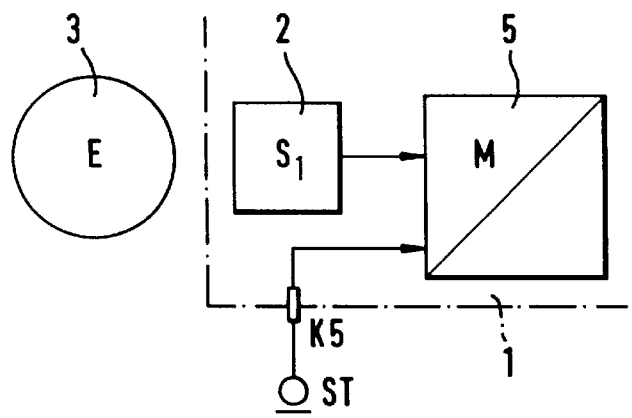
Fig. 3a
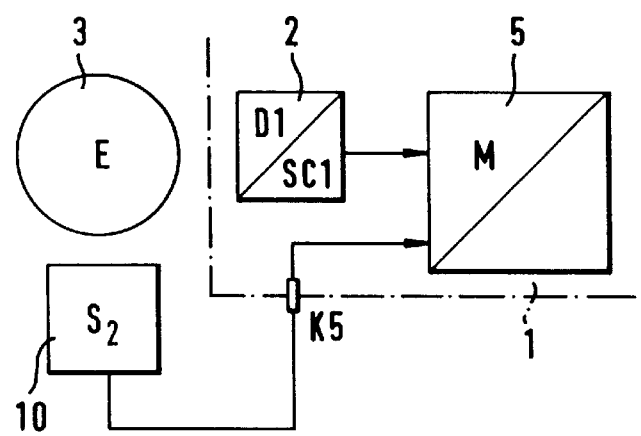
Fig. 3b
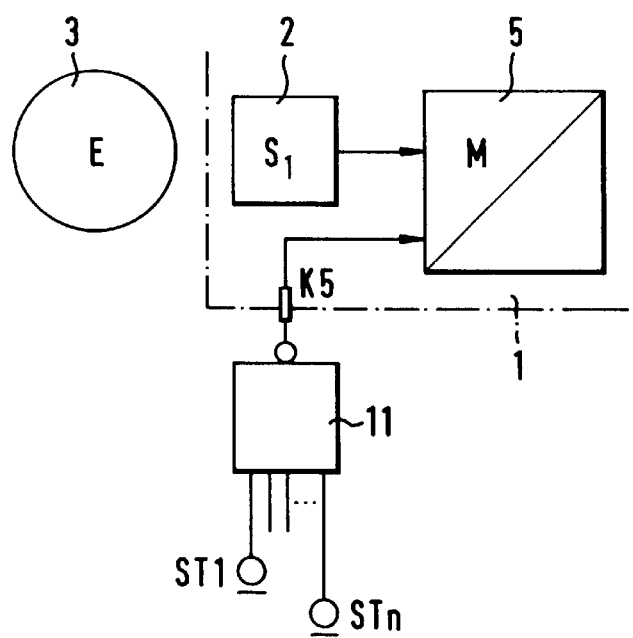
Fig. 3c
Fig. 3

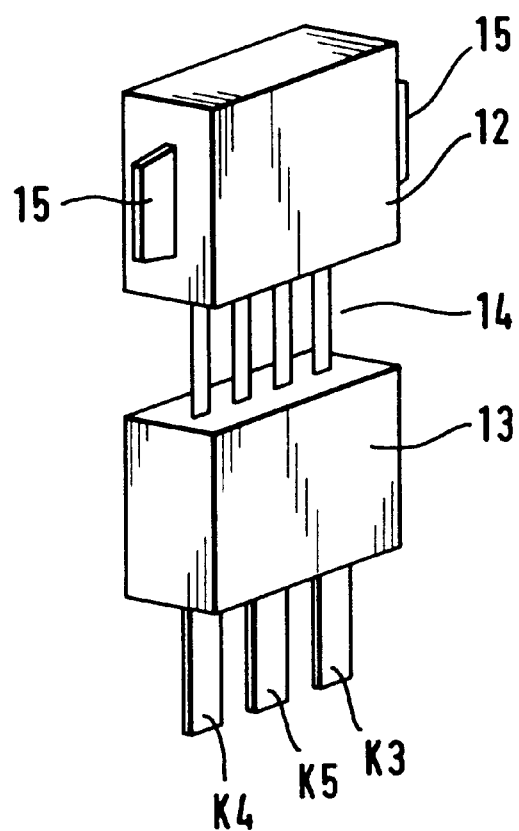
Fig. 4a
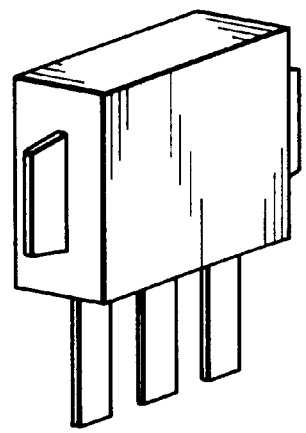
Fig. 4b
Fig. 4

SYSTEM FOR A DETECTING WHEEL ROTATION

TECHNICAL FIELD

The present invention relates to an arrangement for determining the rotational behavior of a wheel or any other rotating body

BACKGROUND OF THE INVENTION

A particularly important case of application for arrangements of this type is the measurement of wheel rotational speeds as an input quantity for an automotive vehicle control system, for example, for an anti-lock system (ABS), for a traction slip control system (TCS), for a driving stability control system (DSC, ASMS), etc. Arrangements of this type are also appropriate to measure other rotational movements in mechanical engineering.

Arrangements and devices to determine the rotational speed of a vehicle wheel are known and customary on the market in many types of design. The measurement systems which basically include a measuring data emitter configured as a toothed wheel or an encoder, and a pick-up for measuring data may principally be designed as passive or active systems or sensors. Inductive sensors, i.e., passive measuring systems, have previously been preferred for technological and cost reasons. Yet active sensors are gaining in usage.

WO 95/17680 (P 7805) describes an active rotational speed sensor. In this publication, the measuring device basically includes an encoder rotating with the wheel, a magnetoresistive sensor element having a permanent magnet that is used as a biassing magnet, and a signal-processing circuit which is incorporated in an integrated circuit. The output signals of the sensor are delivered to a central evaluating circuit.

German patent application No. 44 34 180 (P 7748) discloses a circuit for evaluating the output signal of an active sensor. The output signal of the sensor is a binary current signal having a frequency which contains the information about the rotational movement. The active sensor is a controllable power source which delivers a load-independent current. By way of an associated evaluating circuit, the active sensor is connected to the vehicle battery and is supplied by it with electrical energy.

In an automotive vehicle control system with rotational speed sensors, the output signals of the individual active sensors are generally conducted by way of a two-core cable to a central evaluating circuit which is connected to the vehicle battery and supplies the electrical energy for the operation of the active sensors by way of the two-core cable. Also, proposals have been made to use a single-core cable and to replace the second core by current supply via the vehicle body (P 8693).

The general object of the present invention is to reduce the total expenditure entailed for the measurement and evaluation of the sensed information and, more particularly, to reduce the effort in wiring between the individual sensors and the evaluating circuit or, in other terms, to improve the use of the necessary wiring between the individual active sensors and the (central) evaluating circuit.

It has been found that this object can be achieved by including a sensor module which comprises the sensor element, the power source and a modulator which controls the power source as a function of the signals of the sensor element and of external signals supplied by an external signal source and introduced through an additional port, and which produces as an output signal of the control module a current signal, representative of the rotational behavior, with a superimposed status signal or additional signal.

Thus, the arrangement of the present invention permits a multiple use of the wiring between the active sensor and the evaluating circuit. A special system concept is made use of to this end, wherein the sensor module which comprises a sensor element and a controllable power source is equipped with a modulator which controls the power source supplying the load-independent current in response to an additional external signal and impinges or superimposes an additional signal on the output signal of the signal, or adds a status signal, and delivers it to the central evaluating circuit. Thus, there is multiple use of the wiring.

The evaluating circuit includes a decoder or an identification circuit which identifies and evaluates the status signal or additional signal.

In a preferred aspect of the present invention, the sensor module further has another circuit, that is, an observer, which is connected to the lines interconnecting the sensor module and the evaluating circuit. The observer receives by way of these lines data supplied by the evaluating circuit and controls or monitors, in dependence on these data, the acceptance or processing of the data introduced by way of the additional port. It is possible, for example, to configure the system so that the observer polls and considers the data introduced by way of the additional port only at defined times or under defined conditions.

In another preferred aspect of the present invention, the sensor element of the sensor module has several sensor units for scanning the encoder or measuring data emitter according to different criteria and/or for redundantly identifying measuring values. The last-mentioned case permits monitoring the proper functions, for example.

In still another aspect of the present invention, an external signal source is connected to the additional port of the sensor module and produces a signal derived from the rotational movement of the encoder or any other rotating measuring data emitter irrespective of the sensor elements. Still other status signals determined by sensor means may be introduced through the additional port of the sensor module and conducted to the evaluating circuit by way of the modulator and the signal lines. It may be favorable to condition or evaluate the status signals in the modulator prior to their transmission. These operations can be controlled by the observer.

Further features, advantages and possible applications of the present invention can be seen in the following description of further details of embodiments of the present invention making reference to the accompanying drawings.

BRIEF DESCRIPTION OF THE DRAWINGS

FIG. 2 is a view, in the same representation, of examples for sensor elements of the arrangement of FIG. 1.

FIG. 3 is a view, in the same representation, of examples for wiring the additional port of the arrangement of FIG. 1.

FIG. 4 shows examples for the design of sensor modules of the type shown in FIG. 1.

DETAILED DESCRIPTION OF THE REFERRAL EMBODIMENTS

Figure 1:
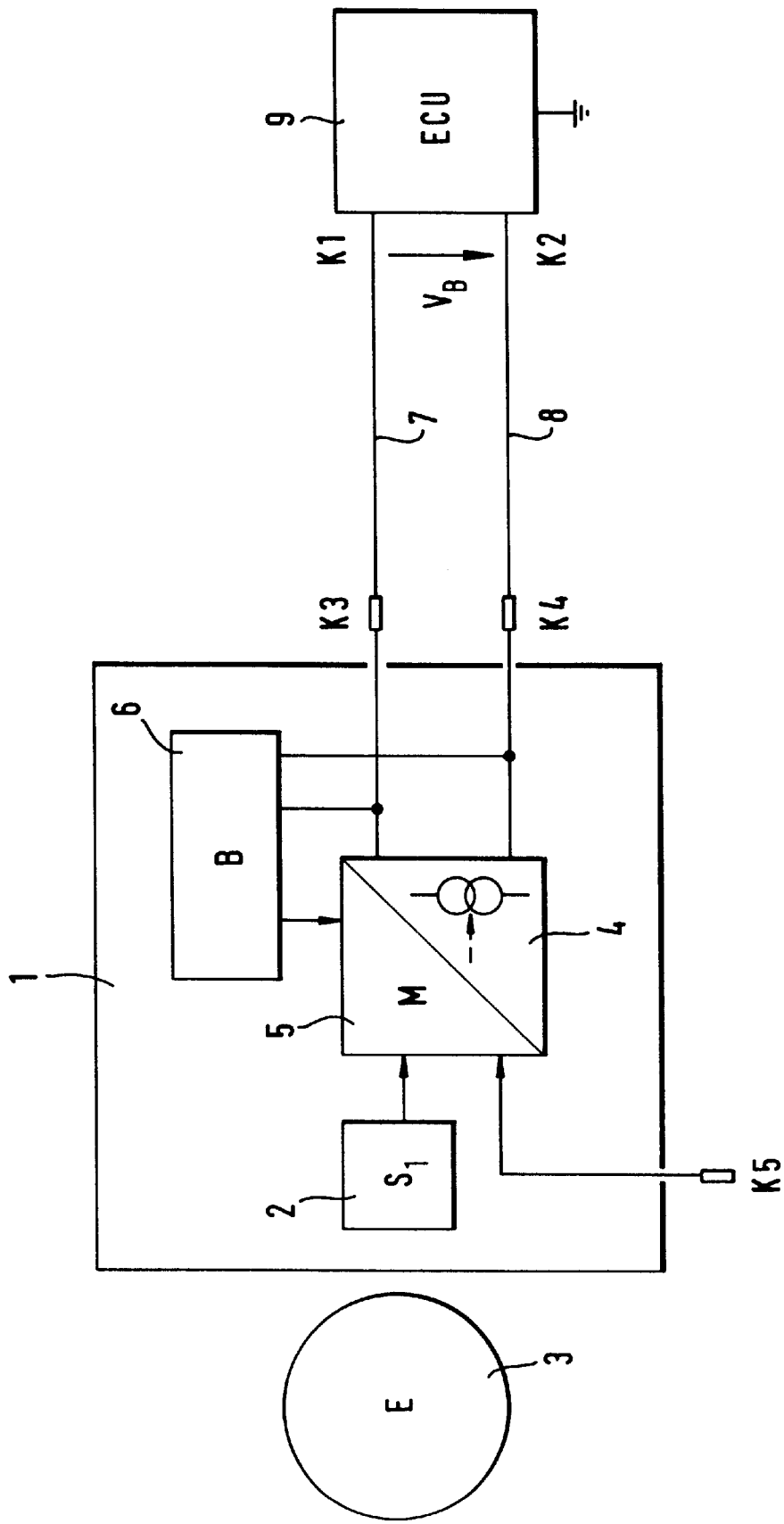
FIG. 1 is a schematically simplified wiring diagram view of the most important components of an arrangement of the type according to the present invention.

According to FIG. 1, an arrangement of the present invention mainly includes a sensor module 1 which comprises a sensor element 2 ($S_1$) that is magnetically coupled to an encoder 3 as known in the art. The encoder 3 or measuring data emitter may be configured as a toothed disc or a wheel provided with magnetic areas. The encoder rotates with the body whose rotational behavior shall be measured, and is magnetically coupled to the sensor element 2 so that the sensor element 2 can generate an alternating electronic signal whose frequency corresponds to the rotational speed of the encoder 3.

The present invention relates to active sensors. Therefore, the sensor module 1 has a controllable power source 4 which delivers a load-independent current. A change between two predetermined current amplitudes is sufficient to transmit the sensor signal. The frequency or the duration of the change in current amplitude contains the data about the rotational speed being measured.

Further, the sensor module 1 comprises a modulator 5 (M) which controls the power source 4 as a function of the output signal of the sensor element 2 ($S_1$) and information delivered from an external signal source by way of an additional port K5. Consequently, an additional signal (that may also be a status signal) which is delivered by way of the additional port K5 and is conditioned or evaluated, if required, is superimposed on the binary current signal which represents the rotational speed.

Still further, the sensor module 1 in the embodiment shown in FIG. 1 also includes a circuit which is termed as observer 6 and has inputs $E_1$, $E_2$ which are connected to the transmission or signal lines. The outputs K3, K4 of the sensor module 1 lead to the connecting lines 7, 8. The observer 6 identifies predetermined signal conditions on the signal lines 7, 8 which connect the sensor module to an external evaluating circuit 9 (ECU). The observer 6 monitors and controls the modulator 5 as a function of the signal condition on the connecting lines 7, 8. For example, the acceptance of the additional signals or status signals delivered by way of port K5 can be controlled as a function of predetermined criteria, signal conditions or time specifications by way of the observer 6.

The controllable power source 4 is supplied with electrical energy by way of terminals K1, K2 of the evaluating circuit 9 in an embodiment of the present invention to which FIG. 1 relates. The voltage $V_B$ between the terminals K1 and K2 represents the voltage of a vehicle battery, for example.

A decoder or an identification circuit which identifies and evaluates the status or additional signal introduced by way of the additional port K5 is also comprised in the evaluating circuit 9.

Some examples 2.1 to 2.4 for sensor elements 2 (FIG. 1) are, represented in FIGS. 2a) to 2d). A conditioning circuit SC1 to SC4 is assigned to each sensor element 2.1, 2.2, 2.3 and 2.4. These circuits SC1 to SC4 may of course be designed as components of the modulator (5 in FIG. 1) or the,sensor element (2) and, therefore, are not shown in FIG. 1.

In the embodiment of FIG. 2a), a sensor element 2.1 represents a magnetic-field-sensitive detector known in the art, for example, a magnetoresistive bridge or a Hall element, which has been shown to be appropriate, along with the associated permanent magnets, for an arrangement of the type according to the present invention. Sensor elements of this type are explained in the above-mentioned WO 95/17680 publication, for example.

A sensor element 2.2 in FIG. 2b) has two detectors D1, D2 in which signals, shifted by a local phase, are produced. Derived from these signals, according to known principles, is a one-bit status signal for determining the direction of rotation V/R (forward/backward) of the encoder 3 and, thus, the direction of rotation of the wheel whose rotational behavior shall be measured. The electronics for evaluating the detected signals is incorporated in the associated signal-evaluating circuit SC2.

FIG. 2c) shows in a symbolic view a sensor element 2.3 which, apart from the rotational speed information f, produces a status signal LL for a so-called air slot reserve in a signal conditioning circuit SC3 in interaction with the encoder 3. Active motion sensors of this type are described in German patent applications Nos. 44 34 977 A1 and 44 34 978 A1 (P 7727, P 7728).

FIG. 2d) shows that the functions of the two sensors elements of FIGS. 2b) and 2c) can also be combined.

FIGS. 3a) to 3c) illustrate the activation of different external signal sources by way of the additional port K5 to the modulator 5 (M) of a sensor module 1. In the embodiment of FIG. 3a), this is the most simple case, a defined information is introduced into the modulator 5 by grounding or keeping open the port K5. For example, brake lining wear indicators are known which deliver a status signal of this type. Further, the condition of brake fluid could be monitored and indicated on a corresponding course by way of the port K5.

According to FIG. 3b), an additional external wheel rotational speed sensor 10 (S2) is connected by way of port K5 and scans the same encoder 3 (E) as the sensor element 2 assigned to sensor module 1. However, sensor 10 is placed at a different location on the periphery of encoder 3. Such a configuration of the measurement arrangement is favorable when the technical conditions necessitate the use of two separate rotational speed measuring elements for a bidirectional rotational speed sensing. In this case, initially both local-phase-shifted rotational speed signals are transmitted to the evaluating device 9 (ECU) by way of the modulator 5 (M), and direction identification is performed subsequently.

According to FIG. 3c), a sum status signal is produced by logically combining several sensor status signals ST1 to Stn by using an external electronic circuit 11 and is sent to the sensor module 1 by way of the terminal or port K5. An arrangement of this type is appropriate, for example, to produce an alarm signal when one or more of the individual status signals differ from their desired condition.

FIG. 4 shows a perspective view of the constructive design or the exterior of a sensor module of the arrangement of the present invention. According to FIG. 4a), a sensor module is a combination of two function units 12, 13 each accommodated in a housing. The specific sensor units 2.1 to 2.4 inside the module (as described in FIGS. 2a) to 2d)) which are used to scan an encoder 3 and the associated signal-conditioning circuits SC1 to SC4 are embedded in the function unit 12. Modulator 5 along with controllable power source(s) 4 and the circuit referred to as observer 6 are integrated in function unit 13. Again, terminals K3, K4, K5 extend from the function unit 13 to connect the evaluating circuit 9 (FIG. 1) and the external signal source. Function units 12 and 13 are interconnected by four individual conductors which are globally designated by reference numeral 14. The conductors are so used that all configurations can be achieved which are represented in the FIG. 2 embodiment. In the case according to FIG. 2d), the signal preconditioning step precompresses the signals V/R and LL to make a more complex status signal which is then transmitted by way of a line to the modulator 5 (M).

Lateral surfaces 15 in FIG. 4 are used to exactly align the illustrated sensor member in relation to the reading rack on an encoder 3.

According to FIG. 4, the entire sensor module includes one single member which comprises all units related to sensors and signalling technique. The magnet-sensitive detectors, in turn, use the Hall effect or the magnetoresistive effect.

The sensor module according to FIGS. 4a), b) is shown without the biassing magnet which is encoder-specific. Such magnets are to be attached to the member 12 (FIG. 4a). Expediently, the magnet is chosen so that the sensor modules can be used for operation with ferromagnetic encoders (for example, toothed wheels made of steel) and for operation with magnetized encoders (alternating succession of magnetic north and south poles). Details relating to sensors of this type can be taken from the above-mentioned WO 95/17680).

There are status signals of different consideration. Thus, the direction of rotation information V/R should always be present, whereas the information about brake lining wear must be indicated only when polled. Various possibilities are known for the superposition of the useful signal which represents the rotation and the additional or status data. It is, however, proposed to code the additional data ratiometrically to a reference quantity. In such a ratiometrical coding, the ratio between the individual signal components remains the same when the signal amplitudes vary, for example, due to variations in the battery or supply voltage. The reference quantity can be a reference pulse duration or a reference current amplitude. FIGS. 5a) to 5d) show examples of coded signals which are transmitted from the sensor module 1, by way of terminals K2, K4, to the terminals K1, K2 of the evaluating circuit 9 (ECU).

Figure 5:
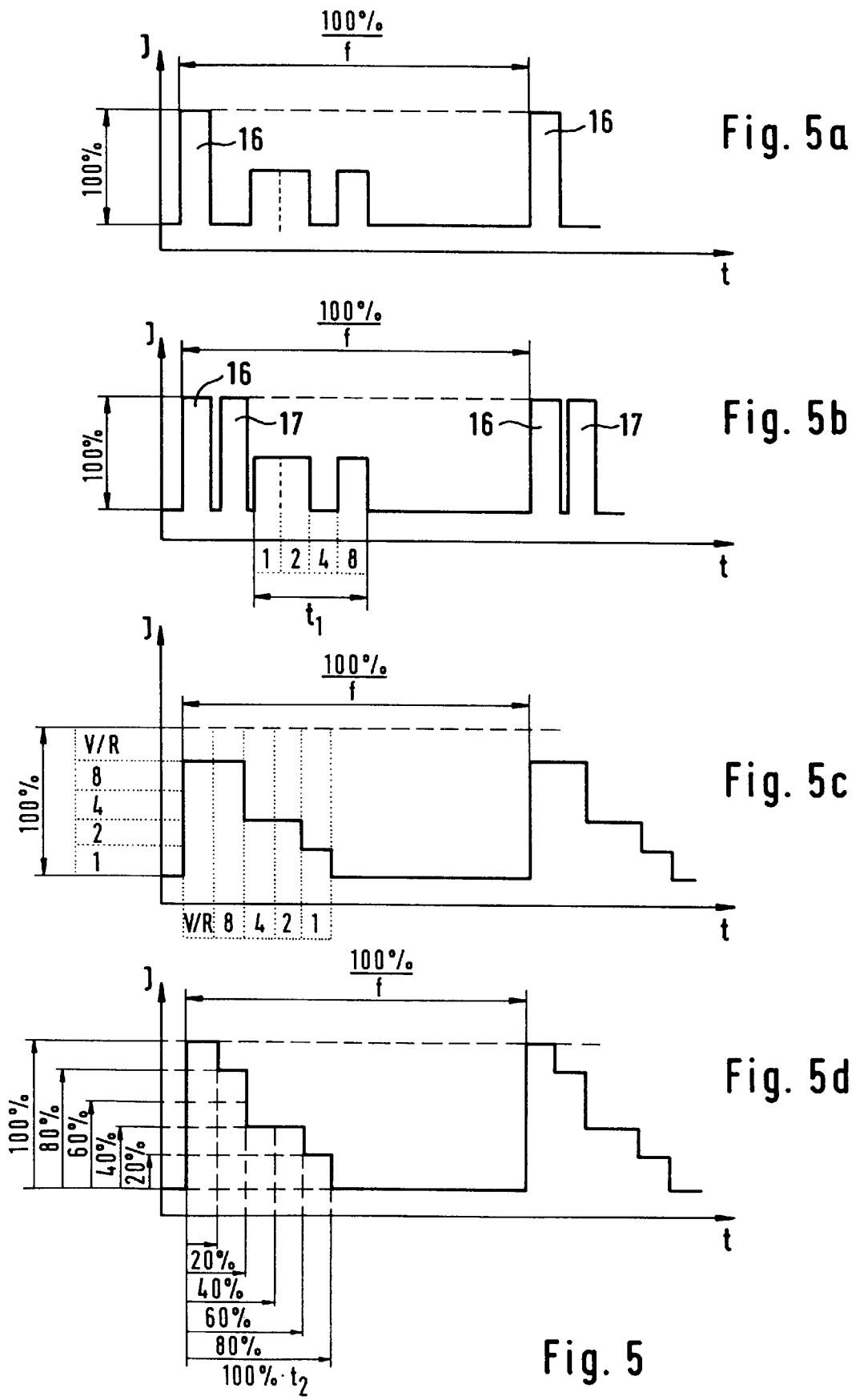
FIG. 5 is a diagrammatic view of some examples for the basic course and the modulation of the signal transmitted to the evaluating circuit of the arrangement of FIG. 1.

The rotational speed information is contained in the frequency for in the distance between the rising edges of pulse 16 in FIG. 5. In the diagram relating to FIG. 5b), an additional pulse 18 is provided which, in conjunction with pulse 16, characterizes the reference opposite direction of the encoder rotation. In contrast thereto, a single pulse 16 or the absence of the pulse (18) signals an encoder rotation in the reference direction according to FIG. 5a). The pulse patterns are repeated with the encoder frequency whose period duration is referred to by 100%. The chain of pulses following pulse 17 and having a time weighting 1, 2, 4, 8 within the time interval $t_1$ is used for coding additional status data in the following example.

In the embodiments of FIGS. 5c) and d), coding takes place by way of the weighted current amplitude, and the V/R information is coded in the start amplitude of each sequence. When the amplitude starts with 80% of the nominal value (FIG. 5c), this means that the encoder 3(E) rotates in the reference direction. When the amplitude starts with 100% (FIG. 5d), this means that the encoder (e) rotates in the reference opposite direction. In the following periods of t2, the weighting 1, 2, 4, 8 is contained in the current amplitudes 20%, 40%, 60%, 80% and can also be expected in the corresponding %-moments of t1.

Basically, a status signal or any other information can be superimposed in many different ways on the actual rotational speed signal which is represented by load-independent currents of changing amplitudes. The additional signal or status signal can principally be transmitted by digital coding—similar to FIG. 5a) and FIG. 5b)—, by superposition of a relatively high-frequent signal, by frequency or pulse-width modulation, etc., by way of the connecting lines 7, 8. Thus, FIGS. 5a) to d) refer only to arbitrary embodiments to explain the principle.

What is claimed is:

1. System for determining the rotational behavior of a rotating body, comprising;
    a sensor element for sensing a rotational characteristic of a rotating body and converting the rotational characteristic into a first signal,
    a sensor modulator having first and second input ports wherein said first input port is coupled to said first signal, and wherein said second input port is adapted to receive a second input signal,
    a power source coupled to a monitor, wherein said monitor is coupled to said first and second signals and said monitor controls the power source as a function of at least one of said first and second signals, wherein said sensor modulator produces an output signal representative of said first and second input signals, wherein the sensor element includes a plurality of sensor units for scanning a measuring data emitter or encoder according to different criteria or for redundantly identifying measuring values.

2. System as claimed in claim 1, further including evaluating circuit coupled to said output signal wherein the evaluating circuit supplies the operating signal for operating the power source by way of signal lines.

3. System wherein as claimed in claim 1, wherein the sensor element is configured as a magnetic pick-up for measuring data which is magnetically coupled by way of an air slot to a measuring data emitter or encoder rotating with the body whose rotational behavior shall be measured.

4. System as claimed in claim 1, wherein the sensor element a plurality of sensor units for scanning the measuring data emitter or encoder according to different criteria or for redundantly identifying measuring values.

5. System as claimed in claim 1, wherein the sensor module includes an observer which is connected to said signal lines interconnecting the sensor module to the evaluating circuit, wherein the observer receives data by way of said signal lines, and controlls the monitor in response to said data.

6. System as claimed in claim 1, wherein said second signal derived from the rotational movement of the rotating body irrespective of the sensor element.

7. System as claimed in claim 1, wherein said second signal is generated by a status sensor.

8. System as claimed in claim 7, wherein said second signal is conditioned or evaluated by the modulator.

9. System as claimed in claim 7, wherein the transmitting, conditioning and/or evaluating operations of the modulator are controlled by the observer by way of control signals passed along said signal lines.

10. System for determining the rotational behavior of a rotating body, comprising;
    a sensor element for sensing a rotational characteristic of a rotating body and converting the rotational characteristic into a first signal,
    a sensor modulator having first and second input ports wherein said first input port is coupled to said first signal, and wherein said second input port is adapted to receive a second input signal,
    a power source coupled to a monitor, wherein said monitor is coupled to said first and second signals and said monitor controls the power source as a function of at least one of said first and second signals, wherein said sensor modulator produces an output signal representative of said first and second input signals, wherein the sensor module includes an observer which is connected to said signal lines interconnecting the sensor module to an evaluating circuit, wherein the observer receives data by way of said signal lines, and controlls the monitor in response to said data.

11. System for determining the rotational behavior of a rotating body, comprising;
- a sensor element for sensing a rotational characteristic of a rotating body and converting the rotational characteristic into a first signal,
- a sensor modulator having first and second input ports wherein said first input port is coupled to said first signal, and wherein said second input port is adapted to receive a second input signal,
- a power source coupled to a monitor, wherein said monitor is coupled to said first and second signals and said monitor controls the power source as a function of at least one of said first and second signals, wherein said sensor modulator produces an output signal representative of said first and second input signals, wherein said second signal is derived from the rotational movement of the rotating body irrespective of the sensor element.

12. System for determining the rotational behavior of a rotating body, comprising;
- a sensor element for sensing a rotational characteristic of a rotating body and converting the rotational characteristic into a first signal,
- a sensor modulator having first and second input ports wherein said first input port is coupled to said first signal, and wherein said second input port is adapted to receive a second input signal,
- a power source coupled to a monitor, wherein said monitor is coupled to said first and second signals and said monitor controls the power source as a function of at least one of said first and second signals, wherein said sensor modulator produces an output signal representative of said first and second input signals, wherein said second signal is generated by a status sensor.

13. System as claimed in claim 12, wherein said second signal is conditioned or evaluated by the modulator.

14. System as claimed in claim 12, wherein the transmitting, conditioning and/or evaluating operations of the modulator are controlled by an observer.

* * * * *